United States Patent
Quittmann et al.

(10) Patent No.: US 10,689,505 B2
(45) Date of Patent: Jun. 23, 2020

(54) MICROSPHERES

(71) Applicant: Merck Patent GmbH, Darmstadt (DE)

(72) Inventors: Ulrich Quittmann, Floersheim (DE); Volker Wilhelm, Lorsch (DE); Hans-Juergen Brehm, Lindenfels (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 15/321,215

(22) PCT Filed: Jun. 11, 2015

(86) PCT No.: PCT/EP2015/001177
§ 371 (c)(1),
(2) Date: Dec. 22, 2016

(87) PCT Pub. No.: WO2015/197162
PCT Pub. Date: Dec. 30, 2015

(65) Prior Publication Data
US 2017/0152372 A1 Jun. 1, 2017

(30) Foreign Application Priority Data
Jun. 23, 2014 (DE) .............. 10 2014 008 962

(51) Int. Cl.
*C08K 9/10* (2006.01)
*B41M 5/26* (2006.01)

(52) U.S. Cl.
CPC .............. *C08K 9/10* (2013.01); *B41M 5/267* (2013.01); *C08K 2201/005* (2013.01)

(58) Field of Classification Search
CPC ...... C08K 9/10; C08K 3/0075; C08K 3/2279; C08K 3/0083; C08K 3/0091; C08K 3/22; B41M 5/267
USPC ........................................................ 523/201
See application file for complete search history.

(56) References Cited

U.S. PATENT DOCUMENTS

| 6,503,316 B1 | 1/2003 | Sakoske et al. |
| 6,680,121 B2 | 1/2004 | Sakoske et al. |
| 7,202,288 B2 * | 4/2007 | Kniess .................. B41M 5/267 428/403 |
| 8,178,272 B2 | 5/2012 | Rimoto et al. |
| 9,050,843 B2 * | 6/2015 | Duijnhoven Van ...... B01J 13/04 |
| 9,150,702 B2 | 10/2015 | Gelissen et al. |
| 2003/0108723 A1 | 6/2003 | Sakoske et al. |
| 2006/0074165 A1 | 4/2006 | Gelissen et al. |
| 2007/0029294 A1 | 2/2007 | Peng |
| 2009/0068580 A1 * | 3/2009 | Rimoto .................. B82Y 30/00 430/108.11 |
| 2009/0130451 A1 | 5/2009 | Farrell |
| 2011/0034609 A1 * | 2/2011 | Duijnhoven Van ...... B01J 13/04 524/430 |
| 2012/0298933 A1 | 11/2012 | Gelissen et al. |
| 2015/0259518 A1 * | 9/2015 | Gelissen ............. C09B 67/0097 252/582 |
| 2016/0145421 A1 * | 5/2016 | Wilhelm .................. B01J 13/04 523/137 |
| 2017/0101523 A1 * | 4/2017 | Rueger .................... C08K 9/02 |

FOREIGN PATENT DOCUMENTS

| CN | 1260752 A | 7/2000 |
| CN | 101424890 A | 5/2009 |
| EP | 1190988 A2 | 3/2002 |
| JP | 2001071645 A | 3/2001 |
| JP | 2004042078 A | 2/2004 |
| JP | 2006508842 A | 3/2006 |
| JP | 2011503338 A | 1/2011 |
| WO | 2011/050934 A2 | 5/2011 |
| WO | 2014/060099 A2 | 4/2014 |
| WO | 2014/206523 A1 | 12/2014 |

OTHER PUBLICATIONS

International Search Report dated Aug. 20, 2015 issued in corresponding PCT/EP2015/001177 application (2 pages).
China first Office Action dated May 3, 2018 issued in corresponding CN 201580033633.5 application (12 pages).
Office Action in corresponding JP2016-575100 dispatched Feb. 12, 2019 (pp. 1-4).
Office Action in corresponding TW 104119990 dated Jan. 24, 2019 (pp. 1-12).

* cited by examiner

*Primary Examiner* — Hannah J Pak
(74) *Attorney, Agent, or Firm* — Millen White Zelano & Branigan

(57) ABSTRACT

The present invention relates to microspheres and to the use thereof, preferably as laser-absorbing additive, and to a process for the production thereof.

21 Claims, No Drawings

MICROSPHERES

The present invention relates to microspheres and to the use thereof, preferably as laser-absorbing additive, and to a process for the production thereof.

The identification marking of products is becoming increasingly important in virtually all branches of industry. It is frequently necessary to apply production dates, expiry dates, bar codes, company logos, serial numbers, etc., to plastic parts or flexible plastic films. These markings are currently usually carried out using conventional techniques, such as printing, hot embossing, other embossing methods or labelling. In particular in the case of plastics, however, increasing importance is being attached to a contactless, very rapid and flexible marking method using lasers. With this technique, it is possible to apply graphic prints, such as, for example, bar codes, at high speed, even to non-planar surfaces. Since the marking is located within the plastic article itself, it is durably abrasion-resistant.

It is generally known that, on irradiation with laser light, certain materials, such as polymers, such as, for example, plastics and resins, can absorb energy from the laser light and convert this energy into heat, which is able to induce a colour change reaction (=marking) in the material. Laser-light absorbers are used to improve the absorption of laser light if the intrinsic ability of a polymer with respect to the absorption of laser light is inadequate.

Many plastics, for example polyolefins and polystyrenes, have hitherto been difficult or even impossible to mark using a laser. A $CO_2$ laser which emits infrared light in the region of 10.6 μm only gives rise to a very weak, virtually illegible marking on polyolefins or polystyrenes, even on use of high power. In the case of polyurethane elastomers and polyether-ester elastomers, there is no interaction with Nd-YAG lasers, but embossing occurs on use of $CO_2$ lasers. A plastic must not reflect or transmit any laser light, since then no interaction occurs. Nor must excessively strong absorption take place, however, since in this case the plastic evaporates, leaving only an embossing. The absorption of laser beams, and therefore the interaction with the material, depend on the chemical structure of the composition and on the laser wavelength used. It is frequently necessary to add suitable additives, such as, for example, absorbers, in order to render plastics laser-markable.

The successful absorber should have a very pale inherent colour and/or only have to be employed in very small amounts. The prior art discloses that the contrast agent antimony trioxide satisfies such criteria, as described, for example, in the following patents and patent applications: U.S. Pat. Nos. 4,816,374, 6,214,917 B1, WO 01/00719 A1 and WO 2009/003976 A1. However, antimony trioxide is toxic and suspected of being carcinogenic, and antimony-free laser marking additives are therefore desired.

Antimony-free laser marking additives are known from the literature. For example, EP 1 190 988 A2 describes laser-markable compounds which contain bismuth and at least one additional metal. US 2007/0029294 A1 is directed to laser-markable compounds of the formula MOCl, where M is either As, Sb or Bi, and $BiONO_3$, $Bi_2O_2CO_3$, BiOOH, BiOF, BiOBr, $Bi_2O_3$, $BiOC_3H_5O_7$, etc., as additive.

The use of laser marking additives based on bismuth compounds is well known. The disadvantage of bismuth-based laser marking additives is that they are not suitable for all types of plastic. In certain matrix polymers, the bismuth compounds exhibit strong discoloration, in particular if high processing temperatures, i.e. >220° C., are employed. For example, $Bi_2O_3$ cannot be used as colour former for the laser marking of polyamide, since an exothermic reaction which results in a dark product occurs during processing.

WO 2011/050934 A2 is directed to a laser marking additive which comprises a bismuth-containing compound and a functionalised polymer containing 0.01 to 50% by weight of functional groups. The disadvantage of this laser additive is that the functionalised polymer does not contribute to the colour formation process and therefore reduces the marking performance, especially with respect to the marking speed, if it is employed in polymers, such as, for example, polyamide and polyesters. The use of this laser marking additive in polymers which are laser-markable to an inadequate extent or not at all, such as polyolefins, also results in very poor marking performance, both with respect to marking contrast and also speed, for this reason. In addition, the laser marking additive again exhibits discoloration during processing above the generally low melting point ($T_m$<160° C.) of the functionalised polymer in certain matrix polymers owing to migration of the bismuth compound into the matrix polymer, which causes the undesired exothermic reaction.

The object of the present invention is therefore to find a non-toxic laser marking additive which enables high-contrast marking on exposure to laser light and only contains small amounts of heavy metals and also further improves the contrast and the resolution at low and high marking speeds. Furthermore, the end product should have no or only insignificant background discoloration due to the laser marking additive used.

Surprisingly, it has been found that microspheres which comprise core/shell particles dispersed in a polyolefin matrix, where the core comprises, as absorber, a mixture consisting of one or more bismuth compounds and one or more white pigments and/or pale or white mineral fillers and comprises, as film former, at least one non-olefinic polymer compound, and the shell comprises at least one compatibiliser, exhibit none of the above-mentioned disadvantages and are eminently suitable as laser marking additive for all types of polymer, preferably thermoplastic polymers.

The present invention relates to a microsphere comprising a core/shell particle dispersed in a polyolefin carrier, characterised in that the core comprises, as absorber, a mixture consisting of one or more bismuth compounds and one or more white pigments and/or pale or white mineral fillers and comprises, as film former, at least one non-olefinic polymer compound, and the shell comprises at least one compatibiliser.

Microspheres as such which serve as laser absorbers and are based on core/shell particles are known from the patent applications WO 2004/050766 A1, WO 2004/050767 A1 and WO 2009/003976 A1.

On irradiation with laser light, polymer compositions, such as plastics, which comprise the microspheres according to the invention exhibit unexpectedly high contrast, even at high marking speeds, in the case of a broad range of laser systems. Owing to the synergistic effect between the laser light absorber mixture and the colour former in the core and the polymer of the shell, the pale-coloured microspheres can serve as laser absorbers having improved laser marking performance with respect to contrast and speed compared with the known laser additives which are commercially available and are described in the literature. In addition, the improved performance results in a lower dosage in the end product, which achieves a reduction in costs. Furthermore, the lower dosage in the end product compared with compositions in accordance with the prior art which comprise antimony or bismuth compounds also results in less influence on all other properties of a laser-markable composition of the present invention on incorporation of the microspheres according to the invention. Since bismuth is regarded as a non-toxic heavy metal, it can also be employed in medical applications.

In addition, a lower dosage in the end product means that all other properties, such as, for example, the mechanical properties, of the laser-markable composition according to the invention are influenced less on use of the microspheres according to the invention compared with laser-markable compositions from the prior art which comprise antimony or bismuth compounds as laser light absorbers.

The laser light absorber used can be prepared from bismuth compounds of this type and pale or white mineral fillers and/or white pigments that are able to absorb laser light of a certain wavelength. In the embodiment, this wavelength is between 157 nm and 10.6 µm, the customary wavelength range of lasers. If lasers having longer or shorter wavelengths were to become available, other absorbers may likewise be suitable for an application. Examples of such lasers which operate in the said range are $CO_2$ lasers (10.6 µm), Nd:YAG or Nd:YVO$_4$ lasers (1064 nm, 532 nm, 355 nm, 266 nm) and excimer lasers of the following wavelengths: $F_2$ (157 nm), ArF (193 nm), KrCl (222 nm), KrF (248 nm), XeCl (308 nm) and XeF (351 nm), FAYb fibre lasers, diode lasers and diode array lasers. Preference is given to the use of Nd:YAG lasers and $CO_2$ lasers since these types operate at a wavelength which is particularly suitable for the induction of a thermal process for marking purposes.

Suitable examples of laser light absorbers are oxides, hydroxides, halides, oxyhalides, sulfides, sulfates and phosphates of bismuth. The laser absorber(s) is (are) preferably selected from bismuth trioxide ($Bi_2O_3$) and/or bismuth oxychloride (BiOCl).

Suitable mineral fillers are, in particular, calcium carbonate, calcium silicate, calcium sulfate, kaolin, quartz and talc. In the case of the preferred white pigments, particular mention should be made of titanium dioxide, barium sulfate, zinc oxide and zinc sulfide. Titanium dioxide is particularly preferred.

In a preferred embodiment, the microspheres according to the invention comprise a mixture of $Bi_2O_3$ and $TiO_2$ as laser absorber.

The bismuth compound to white pigment or filler weight ratio in the laser absorber is preferably 99:1 to 1:99 parts, in particular 90:10 to 10:90 parts and very particularly preferably 80:20 to 20:80 parts.

The microspheres preferably comprise 20-90% by weight, in particular 50-90% by weight and very particularly preferably 75-90% by weight of absorber mixture, based on the microsphere.

The absorber, i.e. the mixture of bismuth compound(s), white pigment(s) and/or fillers, is preferably present in the microspheres in the form of particles. The particle size of the absorber is determined by the requirement that the bismuth compound must be capable of being mixed into the polymer in the core. It is known to a person skilled in the art in the area that this miscibility is determined by the total surface area of a certain amount by weight of the bismuth compounds and of the white pigments or fillers and that the person skilled in the art will readily be able to determine the lower limit of the particle size of the absorber mixture to be mixed in if the desired size of the microspheres and the desired amount of absorbers to be mixed in are known. The $D_{50}$ value of the bismuth compounds is preferably in the range 0.2-10 µm, in particular 0.3-3 µm and very particularly preferably in the range 0.5-2 µm.

The white pigment added or the filler ideally has a particle size which enables it to fill interspaces between the absorber particles in the microsphere. The $D_{50}$ value for the white pigments or fillers is preferably 0.02-5 µm, in particular 0.05-2.5 µm and very particularly preferably 0.1-1 µm.

The $D_{50}$ value in this application is determined by means of laser diffraction (Malvern 2000).

$Bi_2O_3$ is commercially available, for example from 5N Plus Lübeck GmbH, Germany (previously MCP-HEK GmbH), from Poch S. A., Poland, or from Merck Millipore GmbH, Germany.

BiOCl is commercially available from Merck KGaA, ChemService Inc., USA, or from PCF Chimie, France.

The $Bi_2O_3$ used preferably has a particle size in the range 0.2-10 µm, in particular 0.3-3 µm and very particularly preferably 0.5-2 µm.

White pigments and pale or white mineral fillers are commercially available, for example from Kronos Titan, Alpha Calcit Sachtleben, Imerys or Rio Tinto. A particularly suitable filler is titanium dioxide in the rutile form. The use of rutile offers the advantage of better weathering properties and higher light fastness.

Particularly suitable are titanium dioxide grades which have a post-coating and are approved for use in plastics.

The $TiO_2$ used preferably has a particle size $D_{50}$ in the range 0.02-5 µm, in particular 0.05-2.5 µm and very particularly preferably 0.1-1 µm.

The core of the microspheres comprises at least one non-olefinic polymer, which is preferably a thermoplastic polymer.

Examples of particularly preferred thermoplastic polymers are preferably selected from the following group:
polyphenylene oxide (PPO)
polystyrene (PS) mixtures comprising >10% of PS
polyesters
polysulfones
polycarbonates
polyurethanes
or mixtures thereof.

Examples of polyesters are polybutylene terephthalate (PBT) or polyethylene terephthalate (PET).

An example of styrene plastics is styrene-acrylonitrile.

In order to select a suitable polymer, a person skilled in the art in the area will be guided principally by the desired degree of adhesion to the absorber mixture and the requisite colour-formation ability.

In a preferred embodiment, the core comprises PBT or PPO/PS or styrene-ethylene/butylene-styrene (SEBS) or mixtures thereof as colour former.

In a particularly preferred embodiment, the core of the microspheres consists of
50-90% by weight of an absorber mixture, preferably $Bi_2O_3$/$TiO_2$
10-50% by weight of a non-olefinic polymer colour former, in particular PBT or PPO/PS,
based on the core/shell particle.

The adhesion of the polymer of the core to the absorber mixture is generally better than that of core and compatibiliser (=shell). This ensures the integrity of the microspheres during processing thereof.

A chemical reaction between the absorber mixture and the polymer in the core should be avoided. Such chemical reactions could cause decomposition of the absorber mixture and/or polymer, resulting in undesired by-products, discoloration and poor mechanical and marking properties.

In the microspheres according to the invention, the core is embedded in a shell which comprises a compatibiliser.

The compatibiliser is responsible, inter alia, for forming the microspheres during production in the case of the use of reactive extrusion. In a preferred embodiment, the compatibiliser (=shell) and the polymer of the core have different polarity. In addition, the compatibiliser, owing to its different polarity from the core, improves the integrity of the core.

The compatibiliser is preferably a thermoplastic polymer. Preferred thermoplastic polymers contain functional groups, such as, for example, carboxylic acid groups, alkoxysilane groups or alcohol groups. The compatibiliser of the present invention is preferably a thermoplastic polymer. The compatibiliser is particularly preferably a grafted thermoplastic polymer. In a preferred embodiment, the grafted thermoplastic polymer is a grafted polyolefin. Polyolefin polymers are, for example, homo- and copolymers comprising one or more olefin monomers which can be grafted to an ethylenically unsaturated, functionalised compound. Examples of suitable polyolefin polymers are ethylene and propylene homo- and copolymers. Examples of suitable ethylene polymers are all thermoplastic homopolymers of ethylene and copolymers of ethylene with one or more α-olefins having 3-10 carbon atoms as comonomer, in particular propylene, isobutene, 1-butene, 1-hexene, 4-methyl-1-pentene and 1-octene, which can be prepared using known catalysts, such as, for example, Ziegler-Natta, Phillips and metallocene catalysts. The amount of comonomer is generally 0-50% by weight, preferably 5-35% by weight, based on the weight of the entire composition. Such polyethylenes are, for example, known as high-density polyethylene (HDPE), low-density polyethylene (LDPE), linear low-density polyethylene (LLDPE) and linear very low-density polyethylene (VL(L)DPE).

Suitable polyethylenes preferably have a density of 860-970 kg/m$^3$, measured at 23° C. in accordance with ISO 1183. Examples of suitable propylene polymers are homopolymers of propylene and copolymers of propylene with ethylene in which the proportion of ethylene is at most 30% by weight and preferably at most 25% by weight.

Examples of suitable ethylenically unsaturated functionalised compounds are the unsaturated carboxylic acids as well as esters, anhydrides and metal or non-metal salts thereof. The ethylenic unsaturation in the compound is preferably conjugated with a carbonyl group. Examples are acrylic, methacrylic, maleic, fumaric, itaconic, crotonic, methylcrotonic and cinnamic acid as well as esters, anhydrides and possible salts thereof. Of the compounds mentioned containing at least one carbonyl group, maleic anhydride is preferred.

Examples of suitable ethylenically unsaturated functionalised compounds containing at least one epoxide ring are, for example, glycidyl esters of unsaturated carboxylic acids, glycidyl ethers of unsaturated alcohols and of alkylphenols and vinyl and allyl esters of epoxycarboxylic acids. Glycidyl methacrylate is particularly suitable.

Examples of suitable ethylenically unsaturated functionalised compounds having at least one amine functionality are amine compounds containing at least one ethylenically unsaturated group, for example allylamine, propenyl-, butenyl-, pentenyl- and hexenylamine, amine ethers, for example isopropenylphenylethylamine ether. The amino group and the unsaturated function should be in such an arrangement relative to one another that they do not influence the grafting reaction to an undesired extent. The amines may be unsubstituted, but may also be substituted by, for example, alkyl and aryl groups, halogen groups, ether groups and thioether groups.

Examples of suitable ethylenically unsaturated functionalised compounds having at least one alcohol functionality are all compounds containing a hydroxyl group, which may optionally be etherified or esterified, and an ethylenically unsaturated compound, for example allyl and vinyl ethers of alcohols, such as ethyl alcohol and higher branched and unbranched alkyl alcohols, as well as allyl and vinyl esters of alcohol-substituted acids, preferably carboxylic acids and $C_3$-$C_8$-alkenyl alcohols. In addition, the alcohols may be substituted by, for example, alkyl and aryl groups, halogen groups, ether groups and thioether groups which do not influence the grafting reaction to an undesired extent.

In the preferred embodiment, the compatibiliser is a functionalised polymer, which may be grafted or ungrafted. Particular preference is given to an ungrafted copolymer of ethylene and glycidyl methacrylate (ethylene-GMA).

The amount of the ethylenically unsaturated functionalised compound in the polyolefin polymer functionalised by grafting is preferably in a range from 0.05 to 1 mg eq. per gram of polyolefin polymer. The compatibiliser is most preferably polyethylene grafted to maleic anhydride or polypropylene grafted to maleic anhydride.

The amount of compatibiliser, relative to the polymer in the core of the microspheres, is, for example, in the range 2-50% by weight and is preferably 2-30% by weight.

Both the polymer in the core and also the polymer in the shell are preferably, independently of one another, thermoplastic polymers, since this simplifies the mixing of the bismuth absorber(s) into the polymer in the core or of the microspheres into a matrix polymer in order to make it suitable for laser writing.

If the polymer in the core and the compatibiliser in the shell contain functional groups, these functional groups may be bonded to one another. Thus, the core of the microspheres is surrounded by a shell which can be bonded to the polymer in the core via the respective functional groups.

The present invention furthermore relates to the use of microspheres as laser marking additive. The use of the microspheres as laser-absorbing additive in a polymer matrix shows an optimum colour-formation ability. The activity of the microspheres appears to be based on the transmission of the energy absorbed from the laser light to the polymer in the core. The polymer may decompose due to this release of heat, causing the colour change.

The absorbers are present in the microspheres, for example, in the form of particles. The particle size of the absorbers is determined by the requirement that the absorbers must be capable of being mixed into the polymer in the core. It is known to a person skilled in the art in the area that this miscibility is determined by the total surface area of a certain amount by weight of absorber and that the person skilled in the art will readily be able to determine the lower limit of the particle size of the absorbers to be mixed in if the desired size of the microspheres and the desired amount of absorbers to be mixed in are known.

Finally, the core/shell particles are dispersed in a carrier polymer which in the present invention is a polyolefin matrix. This polyolefin matrix contains absolutely no functional groups and is preferably a polyethylene, in particular LLDPE. The same polymers as those mentioned for the compatibiliser, albeit in their non-functionalised form, may be considered as carrier polymer. The amount of carrier polymer is preferably in the range 20-60% by weight of the entire polymer comprising core, shell and absorber mixture.

In a particularly preferred embodiment, the microspheres consist, in accordance with the present application, of

| | | |
|---|---|---|
| 25-70% by weight | of Bi$_2$O$_3$/TiO$_2$ | (=core) |
| 8-25% by weight | of PPO/PS or PBT | (=core) |
| 0.5-7.5% by weight | of grafted polyolefin | (=shell) |
| 20-50% by weight | of polyolefin | (=carrier polymer) |
| 0-5% by weight | of additives | |
| or | | |
| 25-70% by weight | of Bi$_2$O$_3$/TiO$_2$ | (=core) |
| 8-25% by weight | of PPO/PS or PBT | (=core) |
| 0.5-7.5% by weight | of SEBS | (=shell) |
| 20-50% by weight | of polyolefin | (=carrier polymer) |
| 0-5% by weight | of additives | |
| or | | |
| 25-70% by weight | of Bi$_2$O$_3$/TiO$_2$ | (=core) |
| 8-25% by weight | of PPO/PS or PBT | (=core) |
| 0.5-7.5% by weight | of ethylene-GMA | (=shell) |
| 20-50% by weight | of polyolefin | (=carrier polymer) |
| 0-5% by weight | of additives | | based on the microspheres, where the % by weight are in total ≤100%.

The polymer in the core, in the shell and in particular the carrier polymer may additionally comprise one or more pigments, colorants and/or dyes or a mixture thereof. This has the advantage that a separate coloured masterbatch does not have to be added if the microspheres are mixed with a matrix polymer, such as a plastic or resin.

With respect to their size, the microspheres according to the invention preferably have an average diameter in the range 0.5-10 μm, more preferably in the range 0.5-5 μm and especially preferably in the range 1-3 μm.

In order to provide a laser-markable composition, the microspheres are mixed, for example, into the matrix polymer. It is possible to select the matrix polymer as the carrier polymer. The matrix polymer may optionally also be added as a further polymer in order to achieve improved mixing into a greater amount of the matrix polymer later.

The present invention also relates to a process for the production of the microspheres according to the invention. In a preferred embodiment, the microspheres are produced by means of reactive extrusion. In a first step, the light absorber(s), preferably Bi$_2$O$_3$ and TiO$_2$, and the melt of the polymer forming the core are mixed. The ratio between the amount of the polymer forming the core and the amount of light absorber(s) is in the range from 90% by vol.: 10% by vol. to 40% by vol.: 60% by vol. This ratio is more preferably in the range from 80% by vol.: 20% by vol. to 50% by vol.: 50% by vol. In the second step, the mixture of absorber(s) and polymer melt is mixed with the compatibiliser. This mixing is preferably carried out above the melting point of both polymer and compatibiliser, preferably in the presence of an amount of a non-functionalised carrier polymer. Suitable carrier polymers are, in particular, those which have been mentioned above for the compatibiliser, but in their non-functionalised form. This carrier polymer does not have to be the same as the compatibiliser. The presence of a non-functionalised carrier polymer ensures suitable melt-processability of the entire mixture, so that the desired homogeneous distribution of the microspheres is obtained.

In order to obtain a laser-markable polymer composition, the microspheres according to the invention are mixed into the polymer matrix. It has been found that the matrix polymer comprising the microspheres according to the invention can be marked with very high contrast and at very high speed compared with known compositions.

The present invention therefore also relates to a laser-markable composition which comprises a matrix polymer and microspheres according to the invention.

All known matrix polymers, such as, for example, plastics, binders, resins, etc., can be employed for the laser-marking and laser-welding application. Suitable plastics are thermoplastics and thermosets, such as, for example, polyethylene (PE), polypropylene (PP), polyamide (PA), polyester, polyether, polyphenylene ether, polyacrylate, polyurethane (PU), polyoxymethylene (POM), polymethacrylate, polymethyl methacrylate (PMMA), polyvinyl acetate (PVAC), polystyrene (PS), acrylonitrile-butadiene-styrene (ABS), acrylonitrile-styrene-acrylate (ASA), ABS graft polymer, polybutylene terephthalate (PBT), polyethylene terephthalate (PET), polyvinyl chloride (PVC), polyvinylidene chloride (PVDC), polyvinylidene fluoride (PVDF), polytetrafluoroethylene (PTFE), polycarbonate (PC), polyether sulfones, polyether ketone, thermoplastic polyurethane (TPU), thermoplastic elastomers (TPE), epoxy resin (EP), silicone resin (SI), unsaturated polyester resin (UP), phenol-formaldehyde resin (PF), urea-formaldehyde resin (UF), melamine resin (MF) and copolymers thereof and/or mixtures thereof. The polymer may also be a copolymer or block copolymer, etc. Conventional and suitable additives may be present.

Examples of preferred matrix polymers are ultrahigh-molecular-weight polyethylene (UHMWPE), for example from Solpor™, styrene plastics, including ABS, styrene-acrylonitrile (SAN) and polymethyl (meth)acrylate, polyurethane, polyesters, including PET and PBT, polyoxymethylene (POM), polyvinyl chloride (PVC), polyethylene (PE), polypropylene (PP), polyamide (PA), polyurethane (PU), thermoplastic vulcanisates, such as, for example, Santoprene™ and SARLINK®, thermoplastic elastomers, such as, for example, Hytrel® and Arnitel®, and silicone rubbers, such as, for example, Cenusil® and Geniomer®.

The laser-markable composition in accordance with the present invention may also comprise further additives of which it is known, for example, that they improve certain properties of the matrix polymer or impart further properties on it. Examples of suitable additives are reinforcing materials, such as glass fibres and carbon fibres, nanofillers, such as clays, including wollastonite, mica, pigments, dyes, colorants, fillers, such as calcium carbonate, talc, processing assistants, stabilisers, antioxidants, plasticisers, impact modifiers, flame retardants, mould-release agents, foam formers, etc.

The amount of microspheres in the polymer matrix can extend from very small amounts, such as, for example, 0.1 or 1% by vol., up to 70 to 80% by vol. or more, in each case based on the volume of the compound formed. The microspheres are normally used in amounts such that no or a less negative influence on the contrast of the laser marking result is obtained on irradiation of the composition.

Typical ranges for the concentrations of the microspheres in the polymer matrix or compound for the laser marking are indicated below. For laser marking, 0.2 to 2.0% by weight of microspheres are typically added to the matrix polymer.

The laser-markable composition according to the invention can be prepared by simply mixing the microspheres into the molten matrix polymer.

In general, the incorporation of the microspheres within the matrix polymer is carried out by simple mixing of the plastic pellets with the absorber and optionally with further additives and/or dyes and/or colorants followed by shaping by exposure to heat. During the incorporation of the microspheres, the plastic pellets can optionally be treated with adhesion promoters, organic polymer-compatible solvents, stabilisers, dispersants and/or surfactants which are resistant at the operating temperatures. The doped plastic pellets are usually produced by adding the plastic pellets to a suitable mixer, wetting them with any desired additives, and then adding and incorporating the microspheres. The plastic is generally pigmented by means of a colour concentrate (masterbatch) or a compound. The resultant mixture can then be processed directly in an extruder or injection-moulding machine. The mouldings formed during processing have a very homogeneous absorber distribution. Finally, the laser marking or laser welding is carried out using a suitable laser.

The plastic is preferably marked or welded as follows by means of suitable laser irradiation.

In the laser-marking method, the sample is placed in the ray path of a pulsed laser beam, preferably an Nd:YAG laser. The marking can also be carried out using a $CO_2$ laser, for example using a mask technique. The desired results can also be achieved using other conventional types of laser whose wavelength is within the region of high absorption of the microspheres used. The marking obtained is determined by the irradiation duration (or number of pulses in the case of a pulsed laser) and by the power emitted by the laser and also by the polymer system used. The power of the laser used depends on the specific application and can readily be determined in a specific case by a skilled worker.

In the case of laser marking, the laser used generally has a wavelength in a range from 157 nm to 10.6 µm, preferably in a range from 532 nm to 10.6 µm. Examples which may be mentioned are a $CO_2$ laser (10.6 µm) and an Nd:YAG laser (1064 nm, 532 nm or 355 nm), as well as a pulsed UV laser. Excimer lasers have the following wavelengths: $F_2$ excimer laser: 157 nm, ArF excimer laser: 193 nm, KrCl excimer laser: 222 nm, KrF excimer laser: 248 nm, XeCl excimer laser: 308 nm, XeF excimer laser: 351 nm, and frequency-multiplied Nd:YAG laser: wavelength of 355 nm (frequency-tripled) or 265 nm (frequency-quadrupled). Particular preference is given to the use of Nd:YAG lasers (1064 or 532 nm) and $CO_2$ lasers. The energy densities of the lasers used are generally within a range from 0.3 mJ/cm$^2$ to 50 J/cm$^2$, preferably from 0.3 mJ/cm$^2$ to 10 J/cm$^2$.

If pulsed lasers are used, the pulse frequency is generally within a range from 1 to 150 kHz. Corresponding lasers which can be used in the process according to the invention are commercially available.

The marking using the laser is preferably carried out by introducing the article into the ray path of a $CO_2$ laser (10.6 µm) or a pulsed laser, preferably an Nd:YAG laser.

The laser welding is carried out by introducing the sample into the ray path of a continuous wave laser, preferably an Nd:YAG or diode laser. The wavelengths are preferably between 808 and 1100 nm. Since most polymers are more or less transparent at these wavelengths, the absorption property is achieved by the addition of the microspheres. Welding using other conventional types of laser is likewise possible if they operate at a wavelength at which the absorber in the microspheres used exhibits high absorption. The welding is determined by the irradiation duration and the irradiation power of the laser and also the plastic system used. The power of the lasers used depends on the particular application and can readily be determined for the individual case by a person skilled in the art in the area.

The compositions which comprise the microspheres as laser marking additive according to the invention can be used in any desired area in which conventional printing processes have hitherto been used for the inscription or marking of matrix polymers. Virtually any plastic article can be obtained in laser-markable or laser-markable form. Any type of article which consists of a matrix polymer, such as a plastic, can be provided with function data, bar codes, logos, graphics, pictures and identification codes. In addition, they can be used in medical equipment, such as tubes, containers for tissue samples or fluids, syringes, pots, covers, catheters, in the automobile sector, for example for fluid containers, cabling, components, in the telecommunications and E&E sectors, for example for GSM fronts, keyboards, microswitches, in security and identification applications, such as, for example, credit cards, identification cards, animal identification tags, labels, security strips, in marketing applications, such as, for example, logos, decoration on corks, golf balls, promotional articles, in packaging, such as, for example, single- and multilayered films, bottles, caps and closures, including screw caps for bottles, security closures and synthetic corks, but are not limited thereto.

For example, mouldings made from the plastics according to the invention can be used in the electrical industry, electronics industry or motor vehicle industry. With the aid of laser light, it is possible to produce identification markings or inscription markings even at points to which access is difficult, for example on cables, lines, decorative strips or functional parts in the heating, ventilation or cooling sector or on switches, plugs, levers or handles which consist of plastic according to the invention. The polymer system according to the invention can also be used for packaging in the food and drinks sector or in the toys sector. The markings on the packaging are wipe- and scratch-resistant, resistant during downstream sterilisation processes, and can be employed in a hygienically clean manner during the marking process. Complete label motifs can be applied in a durable manner to packaging of reusable systems. A further important application sector for laser marking is the marking of plastics for the production of individual identification markings for animals, which are known as cattle ear tags or simply ear tags. The information specifically associated with the animal is stored via a bar code system. It can be called up again when required with the aid of a scanner. The marking must be extremely resistant, since some tags remain on the animals for many years.

Laser welding with the microspheres according to the invention can be carried out in all areas in which conventional joining methods have been employed and in which it was hitherto not possible to employ the welding process owing to laser-transparent polymers or pale colours. The welding process for laser-transparent plastics thus represents an alternative to conventional joining methods, for example high-frequency welding, vibration welding, ultrasound welding, hot-air welding or also adhesive bonding of plastic parts.

The following examples are intended to explain the invention, but not to restrict it. The percentages relate to the weight, unless indicated otherwise.

EXAMPLES

Process for the preparation of a laser marking absorber concentrate (LMAC, Table 1) and the comparative compounding concentrate (CCC, Table 1.1) using
as the first polymer (core polymer):
P1.0 polybutylene terephthalate 1060 (DSM)
P1.1 Noryl 6850H-100 (mixture of PPO/PS 50/50, Sabic®)
P1.2 polybutylene terephthalate Crastin 6130 NC010 (Dupont) as the second polymer (shell: compatibiliser):
P2.0 Fusabond® 525N polyethylene (Dupont), grafted to 0.9% by weight of MA P2.1 Kraton 1650G (Dupont)
P2.2 Lotader AX8840 random copolymer, ethylene and 8% by weight of glycidyl methacrylate as the third polymer (carrier polymer):
P3 linear low-density polyethylene (LLDPE Sabic) M50002 as the absorber:
A-1 bismuth oxide ($Bi_2O_3$) having a $D_{50}$ of 1 μm (5N Plus Lübeck GmbH)
A-2 Iriotec 8825 (Merck KGaA)
A-3 Iriotec 8208 (Merck KGaA)

as white pigment or filler:
F-1 Kronos 2900, $TiO_2$ rutile, Kronos
F-2 Kronos 2220, $TiO_2$ rutile, Kronos
F-3 Fluorocarb ST, precipitated chalk, Central Technology UK as the matrix polymer:
M-1 linear low-density polyethylene M500026 (Sabic)

Process for the preparation of a laser marking absorber concentrate (LMAC, Table 1) and the comparative compounding concentrate (CCC, Table 1.1)

A series of laser marking absorber concentrates LMAC 01-LMAC 06 and comparative compounding concentrates CCC 01-CCC 03 is prepared using a twin-screw extruder (Leistritz Mikro 27). The compositions of the LMACs and CCCs are shown in Tables 1 and 1.1 respectively. For LMAC 01-LMAC 06 and CCC 01-CCC 03, the screw speed is 250 revolutions per minute. The throughput for all compounds is 20 kg/h. In the case of LMAC 01-LMAC 06, the temperature is 260° C. in zone 1 and 260° C. in zone 10 and 280° C. at the extruder head. In the case of CCC 01, the temperature is 210° C. in zone 1 and 220° C. in zone 10, and 220° C. at the extruder head.

TABLE 1

Composition of the laser marking absorber concentrates

| Compound | LMAC 01 | LMAC 02 | LMAC 03 | LMAC 04 | LMAC 05 | LMAC 06 |
|---|---|---|---|---|---|---|
| First polymer | P1.0 20 | P1.2 30 | P1.2 30 | P1.2 20 | P1.1 50 | P1.0 30 |
| Absorber | A-1 57 | A-1 20 | A-1 35 | A-1 57 | A-1 25 | A-1 20 |
| White pigment/filler | F-1 23 | F-1 50 | F-1 35 | F-2 23 | F-1 25 | F-3 50 |

TABLE 1.1

Composition of the comparative compounding concentrates

| Compound | CCC 01 | CCC 02 | CCC 03 |
|---|---|---|---|
| Matrix polymer | M-1 95 | M-1 95 | M-1 90 |
| Absorber | A-1 5 | | |
| Absorber | | A-2 5 | |
| Absorber | | | A-3 10 |

Process for the Preparation of the Laser Marking Concentrates (LMCs)

A series of laser marking concentrates LMC 01-LMC 06 is prepared using a twin-screw extruder (Leistritz Mikro 27). The composition of the LMCs is shown in Table 2. The screw speed is 250 revolutions per minute and the throughput is 20 kg/h. In the case of LMC 01-LMC 06, the temperature is 260° C. in zone 1 and 280° C. in zone 10, and 280° C. at the extruder head.

TABLE 2

Composition of the laser marking concentrates

| Compound | LMC 01 | LMC 02 | LMC 03 | LMC 04 | LMC 05 | LMC 06 |
|---|---|---|---|---|---|---|
| LMAC 01 | 70 | | | | | |
| LMAC 02 | | 70 | | | | |
| LMAC 03 | | | 70 | | | |
| LMAC 04 | | | | 70 | | |
| LMAC 05 | | | | | 50 | |
| LMAC 06 | | | | | | 60 |
| 2nd polymer | P2.0 2 | P2.0 2 | P2.0 2 | P2.2 1.5 | P2.1 5 | P2.1 2.5 |
| 3rd polymer | P3 28 | P3 28 | P3 28 | P3 28.5 | P3 45 | P3 37.5 |

Process for the Preparation of the Laser Marking Diluted Concentrates (LMDCs)

A series of laser marking diluted concentrates LMDC 01-LMDC 06 is prepared using a twin-screw extruder (Leistritz Mikro 27). The composition of the LMDCs is shown in Table 3. The screw speed is 250 revolutions per minute and the throughput is 15 kg/h. In the case of the diluted concentrates LMDC 01-LMDC 06, the temperature is 200° C. in zone 1 and 200° C. in zone 10, and likewise 200° C. at the extruder head.

TABLE 3

Composition of the laser marking diluted concentrates

| | LMDC 01 | LMDC 02 | LMDC 03 | LMDC 04 | LMDC 05 | LMDC 06 |
|---|---|---|---|---|---|---|
| LMC 01 | 9 | | | | | |
| LMC 02 | | 10 | | | | |
| LMC 03 | | | 10 | | | |
| LMC 04 | | | | 9 | | |
| LMC 05 | | | | | 20 | |
| LMC 06 | | | | | | 11 |
| Matrix polymer | M-1 91 | M-1 90 | M-1 90 | M-1 91 | M-1 80 | M-1 89 |

Process for the Preparation of a Laser Marking Product (LMP)

Laser marking products were prepared using a twin-screw extruder (Leistritz Mikro 27). The composition of the LMPs and the processing conditions are shown in Table 4. The screw speed was 250 revolutions per minute and the throughput was 15 kg/h. The temperature was 200° C. in zone 1 and 200° C. in zone 10, and 200° C. at the extruder head.

TABLE 4

Composition of the laser marking products (LMPs)

| Compound | LMP 01 | LMP 02 | LMP 03 | LMP 04 | LMP 05 | LMP 06 |
|---|---|---|---|---|---|---|
| LMDC 01 | 10 | | | | | |
| LMDC 02 | | 10 | | | | |
| LMDC 03 | | | 10 | | | |
| LMDC 04 | | | | 10 | | |
| LMDC 05 | | | | | 10 | |
| LMDC 06 | | | | | | 10 |
| Matrix polymer | M-1 90 | M-1 90 | M-1 90 | M-1 90 | M-1 90 | M-1 90 |

Preparation of Laser Marking Samples

Laser marking samples (LMSAs) are produced using injection moulding. The composition of the LMSAs and the processing conditions are shown in Tables 5a to 5c. The temperature in zone 1 is set at 190° C. for all samples. The temperature in zone 2, zone 3 and at the gate is 220° C. everywhere.

TABLE 5a

Composition and processing conditions of laser marking samples

|  | LMSA 01 | LMSA 02 | LMSA 03 | LMSA 04 | LMSA 05 | LMSA 06 | LMSA 07 | LMSA 08 | LMSA 09 |
|---|---|---|---|---|---|---|---|---|---|
| LMP 01 | 100 | 50 | 25 | | | | | | |
| LMP 02 | | | | 100 | 50 | 25 | | | |
| LMP 03 | | | | | | | 100 | 50 | 25 |
| Matrix polymer | | M-1 50 | M-1 75 | | M-1 50 | M-1 75 | | M-1 50 | M-1 75 |

TABLE 5b

Composition and processing conditions of laser marking samples

|  | LMSA 10 | LMSA 11 | LMSA 12 | LMSA 13 | LMSA 14 | LMSA 15 | LMSA 16 | LMSA 17 | LMSA 18 |
|---|---|---|---|---|---|---|---|---|---|
| LMP4 | 100 | 50 | 25 | | | | | | |
| LMP5 | | | | 100 | 50 | 25 | | | |
| LMP6 | | | | | | | 100 | 50 | 25 |
| Matrix polymer | | M-1 50 | M-1 75 | | M-1 50 | M-1 75 | | M-1 50 | M-1 75 |

TABLE 5c

Composition and processing conditions of laser marking samples

|  | LMSA 19 | LMSA 20 | LMSA 21 | LMSA 22 | LMSA 23 | LMSA 24 | LMSA 25 | LMSA 26 | LMSA 27 |
|---|---|---|---|---|---|---|---|---|---|
| Matrix polymer | M-1 90 | M-1 95 | M-1 97.5 | M-1 90 | M-1 95 | M-1 97.5 | M-1 90 | M-1 95 | M-1 97.5 |
| CCC 01 | 10 | 5 | 2.5 | | | | | | |
| CCC 02 | | | | 10 | 5 | 2.5 | | | |
| CCC 03 | | | | | | | 10 | 5 | 2.5 |

Laser Marking Performance

The laser marking assessments are carried out using a Trumpf VMc5 10.5 watt diode-pumped IR laser system. So-called evaluation matrices are marked. In such matrices, the marking speed (v [mm/sec]) and frequency (f [kHz]) are varied at a given power (p [%]), focal distance (z=0 [at the focus] above the sample) and line spacing. The evaluation matrices essentially indicate what contrast can be obtained at a particular marking speed while varying the laser parameters. An assessment of the laser marking performance with respect to contrast and marking speed, indicated by + and − in a range from excellent (+++++) to poor (−−−−−), is shown in Table 6.

TABLE 6

Assessment of the laser marking performance of the LMSAs at a laser power of 99% and a line speed between 500 and 5000 mm/min

| Sample | Sample marking | Light absorber in percent by weight[1] | Marking performance |
|---|---|---|---|
| | Focal distance [+mm] | | 10 |
| LMSA 01 | matrix polymer: M1 | 0.5 | +++++ |
| LMSA 02 | matrix polymer: M1 | 0.25 | ++++ |
| LMSA 03 | matrix polymer: M1 | 0.125 | +++ |
| LMAS 04 | matrix polymer: M1 | 0.5 | +++++ |
| LMSA 05 | matrix polymer: M1 | 0.25 | ++++ |
| LMSA 06 | matrix polymer: M1 | 0.125 | +++ |
| LMSA 07 | matrix polymer: M1 | 0.5 | +++++ |
| LMSA 08 | matrix polymer: M1 | 0.25 | ++++ |
| LMSA 09 | matrix polymer: M1 | 0.125 | +++ |
| LMSA 10 | matrix polymer: M1 | 0.5 | +++++ |
| LMSA 11 | matrix polymer: M1 | 0.25 | ++++ |
| LMSA 12 | matrix polymer: M1 | 0.125 | +++ |
| LMSA 13 | matrix polymer: M1 | 0.5 | +++++ |
| LMSA 14 | matrix polymer: M1 | 0.25 | ++++ |
| LMSA 15 | matrix polymer: M1 | 0.125 | +++ |
| LMSA 16 | matrix polymer: M1 | 0.5 | ++++ |
| LMSA 17 | matrix polymer: M1 | 0.25 | +++ |
| LMSA 18 | matrix polymer: M1 | 0.125 | ++ |
| LMSA 19 | matrix polymer: M1 | 0.5 | +++ |
| LMSA 20 | matrix polymer: M1 | 0.25 | +− |
| LMSA 21 | matrix polymer: M1 | 0.125 | −− |
| LMSA 22 | matrix polymer: M1 | 0.5 | ++ |
| LMSA 23 | matrix polymer: M1 | 0.25 | +− |
| LMSA 24 | matrix polymer: M1 | 0.125 | −− |
| LMSA 25 | matrix polymer: M1 | 0.5 | + |
| LMSA 26 | matrix polymer: M1 | 0.25 | −+ |
| LMSA 27 | matrix polymer: M1 | 0.125 | −− |

[1]based on the total amount of laser markable composition.

The invention claimed is:

1. A microsphere comprising core/shell particles dispersed in a
polyolefin carrier matrix,
wherein
said core of the core/shell particles comprises,
an absorber which is a mixture consisting of $Bi_2O_3$ and $TiO_2$ ($Bi_2O_3/TiO_2$),
a film former which comprises PPO/PS or PBT,
and
said shell of the core/shell particles comprises
at least one compatibilizer that is a grafted polyolefin, ethylene-GMA or styrene-ethylene-butylene-styrene (SEBS),
wherein the $D_{50}$ value for $TiO_2$ is in the range of 0.02-5 µm
and
wherein said microsphere comprises
25-70% by weight of the $Bi_2O_3/TiO_2$,
8-25% by weight of the PPO/PS or PBT,
0.5-7.5% by weight of grafted polyolefin, ethylene-GMA or SEBS compatibilizer,
20-50% by weight of the polyolefin carrier matrix, and may also comprise
0-5% by weight of additives,
based on the microsphere, where the % by weight add up to ≤100%.

2. The microsphere according to claim 1, wherein the $Bi_2O_3/TiO_2$ weight ratio is 99:1 to 1:99 parts.

3. The microsphere according to claim 1, wherein the non olefinic polymer PPO/PS or PBT is also a color former.

4. The microsphere according to claim 3, wherein the color former is PPO/PS.

5. The microsphere according to claim 1, wherein the grafted polyolefin compatibilizer is a grafted polyethylene or grafted polypropylene.

6. The microsphere according to claim 1, wherein the grafted polyolefin compatibilizer is a polyethylene grafted to maleic anhydride or a polypropylene grafted to maleic anhydride.

7. The microsphere according to claim 1, wherein the compatibilizer is styrene-ethylene/butylene-styrene (SEBS).

8. The microsphere according to claim 1, wherein the polyolefin carrier matrix is a linear low-density polyethylene (LLDPE), very low-density polyethylene (VLDPE), low-density polyethylene (LDPE) or a metallocene-polyethylene (m-PE).

9. The microsphere according to claim 1, wherein the additives are selected from the group of a glass fiber, a carbon fiber, a nanofiller, a pigment, a dye, a colorant, a filler, a processing assistant, a stabilizer an antioxidant, plasticiser, an impact modifier, a flame retardant, a mould-release agent or foam former.

10. The microsphere according to claim 1, wherein said microsphere has an average particle size of 0.5-3.0 microns.

11. The microsphere according to claim 1, wherein said microsphere consists of
25-70% by weight of $Bi_2O_3/TiO_2$ (=core)
8-25% by weight of PPO/PS or PBT (=core film former)
0.5-7.5% by weight of grafted polyolefin (=shell compatibilizer)
20-50% by weight of polyolefin carrier (=matrix)
0-5% by weight of additives
based on the microsphere, where the % by weight add up to ≤100%.

12. The microsphere according to claim 1, wherein said microsphere consists of
25-70% by weight of $Bi_2O_3/TiO_2$ (=core)
8-25% by weight of PPO/PS or PBT (=core film former)
0.5-7.5% by weight of SEBS(=shell compatibilizer)
20-50% by weight of polyolefin carrier (=matrix)
0-5% by weight of additives
based on the microsphere, where the % by weight add up to ≤100%.

13. The microsphere according to claim 1, wherein said microsphere consists of
25-70% by weight of $Bi_2O_3/TiO_2$ (=core)
8-25% by weight of PPO/PS or PBT (=core film former)
0.5-7.5% by weight of ethylene-GMA (=shell compatibilizer)
20-50% by weight of polyolefin carrier (=matrix)
0-5% by weight of additives
based on the microsphere, where the % by weight add up to ≤100%.

14. A process for the production of the microsphere according to claim 1 wherein said microsphere is formed by reactive extrusion.

15. A method for preparing a laser marking or laser welding composition which comprises adding the microsphere according to claim 1 into a laser marking or laser welding composition.

16. A laser-markable and laser-weldable composition, comprising a matrix polymer and at least one microsphere according to claim 1.

17. The laser-markable and laser-weldable composition according to claim 16, wherein the composition comprises 0.1-1.0% by weight of said at least one microsphere.

18. The laser-markable and laser-weldable composition according to claim 16, wherein the matrix polymer is polyethylene (PE), polypropylene (PP), polyamide (PA), polyester, polyether, polyphenylene ether, polyacrylate, polyurethane (PU), polyoxymethylene (POM), polymethacrylate, polymethyl methacrylate (PMMA), polyvinyl acetate (PVAC), polystyrene (PS), acrylonitrile-butadiene-styrene (ABS), acrylonitrile-styrene-acrylate (ASA), ABS graft polymer, polybutylene terephthalate (PBT), polyethylene terephthalate (PET), polyvinyl chloride (PVC), polyvinylidene chloride (PVDC), polyvinylidene fluoride (PVDF), polytetrafluoroethylene (PTFE), polycarbonate (PC), polyether sulfones, polyether ketone, thermoplastic polyurethane (TPU), thermoplastic elastomers (TPE), epoxy resin (EP), silicone resin (SI), unsaturated polyester resin (UP), phenol-formaldehyde resin (PF), urea-formaldehyde resin (UF), melamine resin (MF), ultrahigh-molecular-weight polyethylene (UHMWPE), styrene plastics, styrene-acrylonitrile (SAN), thermoplastic vulcanisates, thermoplastic elastomers, silicone rubbers or copolymers thereof and/or mixtures thereof.

19. A process for the preparation of the laser-markable and laser-weldable composition according to claim 16, wherein the matrix polymer is mixed with the microspheres and optionally further additives, and finally the resulting mixture is shaped by exposure to heat.

20. The microsphere according to claim 1, wherein the $D_{50}$ value for the $TiO_2$ is 0.05-2.5 µm.

21. The microsphere according to claim 1, wherein the $D_{50}$ value for the $TiO_2$ is 0.1-1 µm.

* * * * *